United States Patent [19]

Bien

[11] Patent Number: 5,207,121
[45] Date of Patent: May 4, 1993

[54] GEAR CASE FOR LOCOMOTIVE DRIVE SYSTEM

[75] Inventor: Paul R. Bien, Downers Grove, Ill.

[73] Assignee: General Motors Corporation, Detroit, Mich.

[21] Appl. No.: 834,745

[22] Filed: Feb. 13, 1992

[51] Int. Cl.$^5$ .......................................... F16H 57/02
[52] U.S. Cl. .................................................. 74/606 R
[58] Field of Search ........................... 74/467, 606 R

[56] References Cited

U.S. PATENT DOCUMENTS

| | | | |
|---|---|---|---|
| 1,119,958 | 12/1914 | Hewitt et al. | 74/606 R |
| 1,365,836 | 1/1921 | Leverett | 74/606 R |
| 1,813,819 | 7/1931 | Ross | 74/606 R |
| 1,826,512 | 6/1932 | Short | 74/606 R |
| 2,081,846 | 5/1937 | Behrens | 74/606 R |
| 4,603,865 | 8/1986 | Bien | 277/12 |
| 4,730,833 | 3/1988 | Foster et al. | 74/606 R X |
| 4,736,819 | 4/1988 | Müller | 74/467 X |
| 4,803,896 | 2/1989 | MacGregor | 74/606 R |
| 4,940,002 | 7/1990 | Bien | 105/136 |
| 4,995,971 | 2/1991 | Droste et al. | 74/606 R X |
| 5,092,196 | 3/1992 | Kameda et al. | 74/606 R |

FOREIGN PATENT DOCUMENTS

| | | | |
|---|---|---|---|
| 58-221064 | 12/1983 | Japan | 74/606 R |
| 1-275962 | 11/1989 | Japan | 74/606 R |
| 320426 | 10/1929 | United Kingdom | 74/606 R |

Primary Examiner—Rodney H. Bonck
Assistant Examiner—Ryan Massey
Attorney, Agent, or Firm—Robert J. Outland

[57] ABSTRACT

A gear case comprises three parts: upper and lower sections of heavy duty castings or fabricated steel, the lower section having an open bottom, and a light gauge sheet metal pan enclosing the bottom of the lower section. Alternatively, the upper and lower sections comprise a one piece rigid housing open at the bottom. The pan is wider than the upper and lower sections to afford extra lubricant capacity. A molded baffle resides in the pan to separate active from reserve volumes of lubricant. The heavy duty sections have machined openings to receive seals and afford dimensional stability. The sheet metal pan is collapsible to take the consequences of impact in case of minor derailment and is easily repaired or replaced.

9 Claims, 3 Drawing Sheets

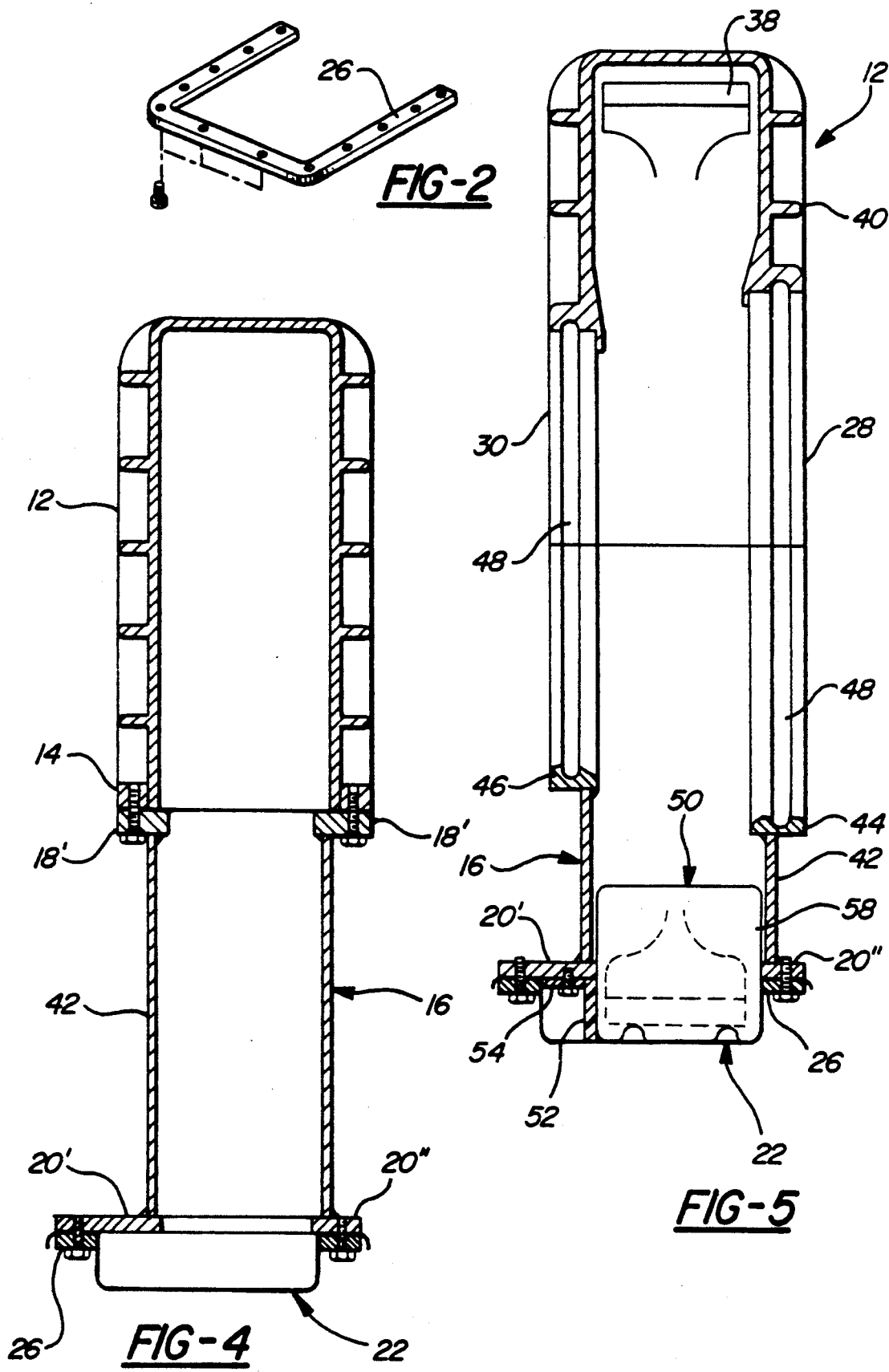

GEAR CASE FOR LOCOMOTIVE DRIVE SYSTEM

TECHNICAL FIELD

This invention relates to a gear case for a locomotive, and particularly to such a gear case which is readily repairable.

BACKGROUND

It is known in the art relating to drive systems for diesel electric locomotives and the like to provide a railway truck mounted axle hung electric traction motor partially supported upon and geared to a drive axle by engaged pinion and drive gears. The gears are lubricated by a fluid lubricant contained in a gear case surrounding the gears on the pinion end of the traction motor and on the axle.

Generally in American locomotives it has been the practice to use a heavy grease-like lubricant which is relatively easily contained, and the gear cases comprise inexpensive two piece sheet metal stampings containing simple seals at the motor shaft and axle openings. European style locomotives, on the other hand, generally utilize a light oil-like lubricant which is contained by more elaborate labyrinth seals mounted in expensive heavy duty gear cases with accurately machined seal supporting surfaces. Some of these arrangements may also contain either an idler gear or two steps of gear reduction, both with additional bearings. For the latter types the gear case is even more complex and expensive. Due to the usage of improved three-phase traction motors having bearings which are conveniently lubricated via the gear case, a light lubricant is becoming desirable even in American locomotives.

A distinct advantage of the sheet metal gear case is the ease of repair or inexpensive replacement in the event of damage. The heavy duty gear cases which may be aluminum castings, for example, and may also be structural members with additional bearings, are not readily repairable and replacement is extremely expensive and time-consuming. The bottom of the gear case, which may be about 4 inches above the rail elevation, is the lowest part of the locomotive other than the wheels. Occasional minor derailments of locomotives do occur and frequently result in damage to the gear case whether it is made of sheet metal or castings. Thus there is a need for a gear case which is suitable for containing light lubricants and at the same time can sustain impact to the bottom of the gear case without damage which is expensive or difficult to repair.

SUMMARY OF THE INVENTION

The present invention provides a gear case having a heavy duty construction suitable for precision machining of the seal receiving openings and a separate bottom section which is collapsible to absorb impact and which is easily replaced at low expense. The advantage is two-fold: the impact is not substantially transferred to the heavy duty casing which would be difficult to repair or replace, and the bottom which does take the damage is inexpensive and easy to repair or replace.

The invention is carried out by a three piece gear case having upper and lower main sections which are castings and/or fabricated steel constructions and which are machined to receive the necessary seals, the lower main section having an open bottom, and an inexpensive collapsible pan enclosing the bottom such that impact on the bottom portion of the gear case will damage only the pan. The pan is also conveniently sized to provide extra lubricant capacity in the gear case and a baffle in the pan separates the lubricant volume in the pan into a reserve volume and an active volume for circulation in the gear case. Alternatively, the upper and lower main sections are combined into a one-piece rigid housing with the collapsible pan enclosing the bottom.

These and other features and advantages of the invention will be more fully understood from the following descriptions of certain specific embodiments of the invention taken with the accompanying drawings.

BRIEF DRAWING DESCRIPTION

In the drawings:

FIG. 2 is an isometric view of a washer plate incorporated in the assembly of FIG. 1;

FIG. 4 is a sectional view of a gear case taken along line 4—4 of FIG. 3 with internal parts omitted;

FIG. 5 is a sectional view of a gear case taken along line 5—5 of FIG. 3 including a gear portion and a baffle.

DETAILED DESCRIPTION

The ensuing description is directed to a gear case embodiment having upper and lower main section of rigid construction which is machined to receive seals, and having an open bottom covered by a collapsible pan. It is to be understood that the structure may be more complex to provide structural support for bearings, as well. Moreover, the upper and lower main sections can be replaced by a one-piece housing which is open at the bottom and covered by a collapsible pan.

Figure 1:
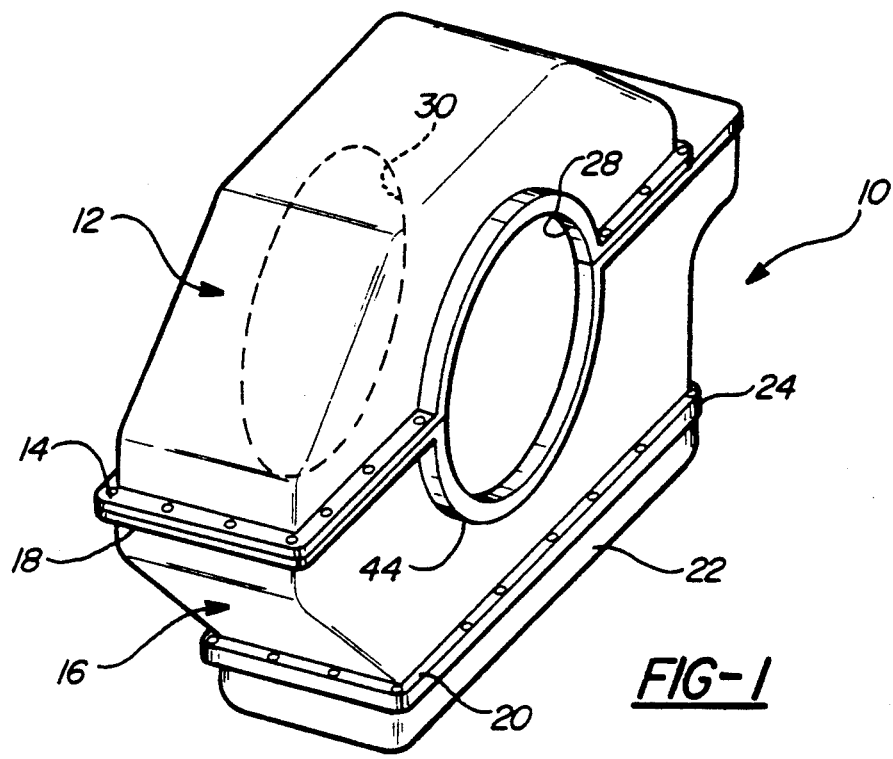
FIG. 1 is an iosmetric view of a conceptual form of a gear case according to the invention.
Figure 6:
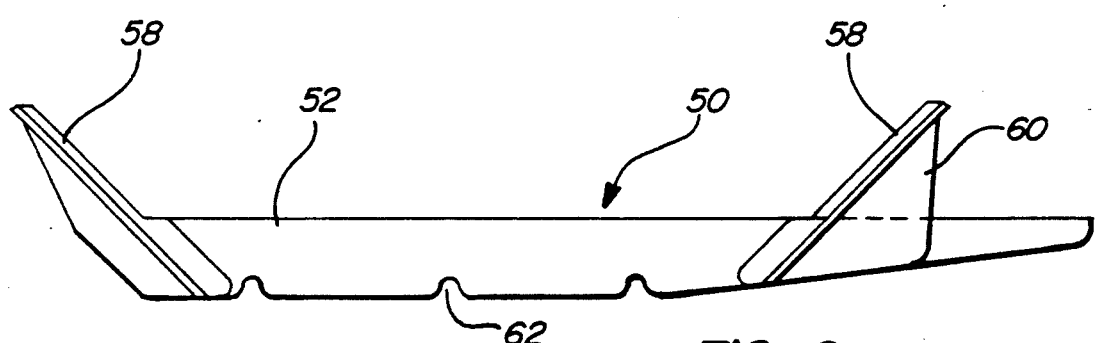
FIGS. 6 and 7 are elevation and plan views respectively of the baffle of FIG. 5.
Figure 7:
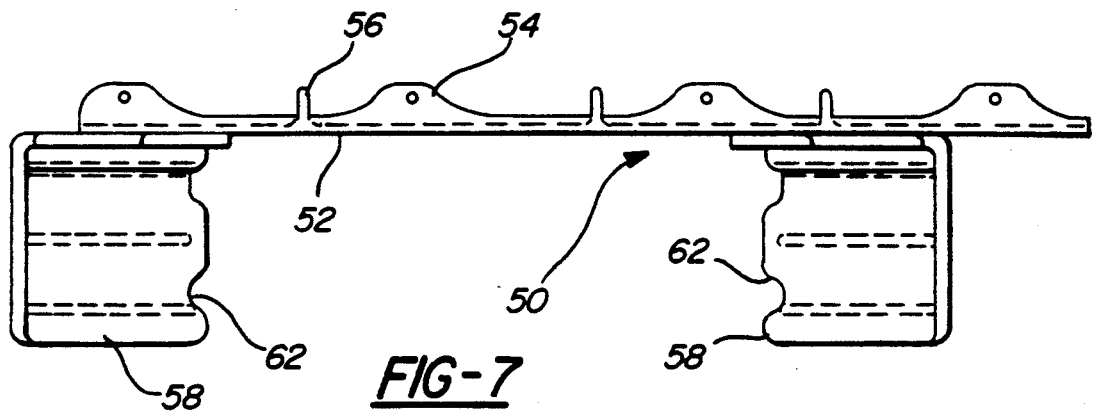

Referring to the drawings in detail, and first to FIG. 1, a gear case 10 for a locomotive drive system includes three sections: an upper main section 12 open at the bottom and terminating in a flange 14, a lower main section 16 open at both top and bottom and bounded by an upper flange 18 bolted to the flange 14 and a lower flange 20, and a closure or pan 22 having a flange 24 secured to the flange 20. The pan 22, similar in structure to the oil pan of an automobile engine, is preferably a pressed light gauge steel or other metal, and to securely fasten it to the flange 20 of the lower section 16 a pair of U-shaped steel washer plates 26 like that shown in FIG. 2 fit beneath the flange 24 of the pan to effectively reinforce the flange 24. Bolts spaced around the periphery of the pan extend through the washer plates 26 and the flange 24 and into the flange 20 to removably fasten the pan 22 to the lower section 16. As an alternative to a sheet metal pan 22, a molded polymer cover could be used, although metal has the advantage of better heat transfer properties for cooling the lubricant within the gear case 10.

Each side of the case 10 has a respective round opening 28, 30 which allows passage of an axle and contains labyrinth seals for containing light viscosity lubricant or oil within the case. Still another opening, not shown, on one side of the gear case 10 admits a motor shaft for driving the gears. Each of the openings is centered on the mating line of the flanges 14 and 18. To assure correct operation of the seals, the openings 28, 30 and the other opening must be made to accurate dimensions and to hold those dimensions. Consequently, the upper and lower main sections 12 and 16 comprise castings or fabricated steel in which openings can be machined to the required shape and size and are sufficiently rigid to hold the tolerances. Aluminum castings are desirable for that purpose because of their light weight.

Figure 3:
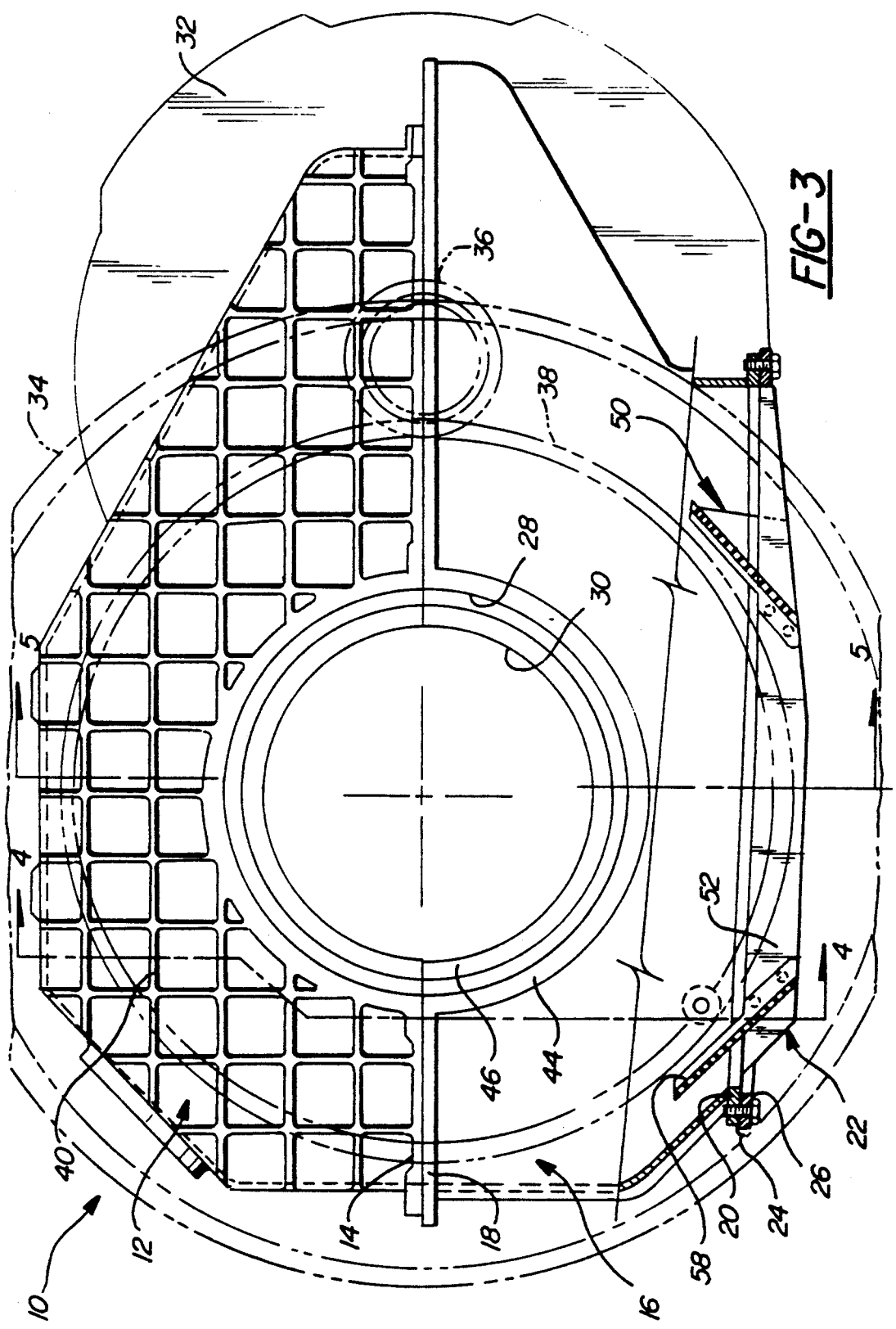
FIG. 3 is a side elevation of a gear case according to the invention and an associated traction motor and wheel.

FIG. 3 shows a specific embodiment of the gear case and its associated traction motor 32 and wheel 34. A pinion 36 driven by the motor 32 and a drive gear 38 driven by the pinion are shown in outline, the gear 38 being coaxial with the openings 28, 30 and arranged to drive the axle which passes through the openings 28, 30. The gear case 10 is elongated to encompass the pinion 36 as well as the drive gear 38. As further shown in FIGS. 4 and 5, the upper main section 12 is a casting having a waffle-like fin pattern 40 on the outside for heat dissipation. The lower main section 16 may have the same construction but here is shown as a fabricated steel structure, having side wall plates 42 welded at their upper ends to flange pieces 18' and to seal support rings 44 and 46, and to flange pieces 20' and 20" at their lower ends. The openings 28 and 30 are diametrically divided between the upper and lower main sections 12, 16, and are machined to form the correct diameter and to shape the openings with grooves 48 that retain the seals.

The closure or pan 22 is secured by its flange 24 and the washer plates 26 to the flange pieces 20' and 20" of the lower section to completely close the bottom opening of the lower section 16. The pan is a stamped or drawn part of light gauge sheet metal which will collapse upon impact rather than transmit the impact force to the main sections 12 and 16 of the gear case 10. Also the pan 22 is inexpensive and easy to replace thus making replacement economical, although in many cases repairs to the pan may be made by welding.

By equipping the gear case with a sheet metal pan 22 to serve as a lubricant reservoir, the pan can be easily shaped and sized to optimize the capacity. As shown in FIGS. 4 and 5, the flange piece 20' is extended laterally outboard of the gear case wall 42 and one side of the pan 22 is made correspondingly wider to afford extra capacity in the region beneath the flange piece 20', in contrast to using a flange piece of minimal width like the piece 20" which results in the pan side wall aligned with the lower section side wall. While it is already known to shape a gear case to obtain the extra lubricant capacity, the three part gear case construction makes such a shape much easier to accomplish.

To illustrate the position of the drive gear 38 in the gear case, FIG. 5 shows the top and bottom portions of the gear. In addition, a baffle 50 is shown in the bottom of the gear case for separating the lubricant volume into an active volume and a reserve volume. The active volume is a pool of lubricant which is in direct contact with the bottom of the drive gear 38 and is circulated throughout the gear case as the gear rotates. The circulating fluid becomes hot by exposure to the gears and motor bearings. The reserve volume of lubricant remains in the pan 22 and remains relatively cool but is available to replenish the circulating lubricant as needed.

The baffle 50, as shown in FIGS. 3 and 5-7, can be a sheet metal fabrication but is preferably a polymer molding. It includes a vertical wall 52 aligned with a side wall 42 and extending over the length and depth of the pan 22 with upper outwardly turned flanges 54 for bolting to the flange 20' of the lower section 16. The baffle also includes vertical stiffening ribs 56 on the vertical wall 52, and a pair of inclined partitions 58 projecting laterally from the wall 52 and positioned just fore and aft of the gear 38. The partitions 58 protrude upward into the lower section 16 and extend from one side wall 42 of the lower section 16 to the other wall. Vertical webs 60 between the partitions 58 and the floor of the pan provide support for the partitions. Small scallops 62 along the bottom of the wall 52 and the partitions 58 allow limited lubricant flow between active and reserve volumes. The active volume is that region between the inclined partitions and bounded by the vertical wall 52 on one side and the wall of the pan on the other side. The reserve volume comprises three parts: small volumes between each partition and the respective end of the pan and a larger volume between the vertical wall 52 and the side of the pan beneath the extended flange 20'. It will be recognized that the three part gear case structure presented herein affords the dimensional stability of heavy duty castings or steel fabrications as well as the easy repair or inexpensive replacement of sheet metal. It also has the features of convenient shaping to provide lubricant reserves and the easy and inexpensive installation of a baffle to for management of the lubricant.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. In a locomotive drive system having an axle mounted rail engaging wheel and an axle hung traction motor and gears connecting the motor with the axle, a gear case enclosing the gears and having a lower part extending close to the rail level and subject to damage by impact to the lower part, the gear case comprising:
   a rigid main housing open at its bottom;
   a collapsible pan enclosing the open bottom of the main housing extending close to rail level and collapsible upon impact so that impact damage to the bottom of the gear case is confined to the collapsible pan and such damage is not extended to the rigid main housing.

2. In a locomotive drive system having an axle mounted rail engaging wheel and an axle hung traction motor and gears connecting the motor with the axle, a gear case enclosing the gears and having a lower part extending close to the rail level and subject to damage by impact to the lower part, the gear case comprising:
   a rigid upper section open at its bottom;
   a rigid lower section having an open top and bottom and joined at the top to the upper section; and
   a collapsible pan enclosing the open bottom of the lower section extending close to rail level and collapsible upon substantial impact so that impact damage to the bottom of the gear case is confined to the collapsible pan and such damage is not extended to the rigid sections.

3. The invention as defined in claim 2 wherein the rigid sections comprise casting and/or fabricated steel construction and the collapsible pan comprises a light gauge sheet metal construction.

4. The invention as defined in claim 2 wherein the gear case contains a gear extending into the pan and the pan contains lubricant and a baffle for separating the lubricant into a reserve volume and an active volume exposed to the gear, the baffle defining openings for feeding oil from the reserve volume to the active volume.

5. The invention as defined in claim 4 wherein the baffle comprises a molded polymer.

6. In a locomotive drive system having a rail engaging wheel axle mounted traction motor and drive gears connecting the motor and axle, a gear case for enclosing the drive gears and containing gear lubricant, the gear case having a lower part extending close to the rail level and subject to damage by impact, the gear case comprising:

rigid upper and lower main casing sections secured together at a mating plane and having machined lateral openings adapted to contain seals for driving and driven shafts;

the lower casing section having an open bottom terminating in a mounting flange; and said lower part comprising a collapsible sheet metal section removably attached to the mounting flange for enclosing the bottom of the lower casing and extending close to rail level, whereby damage to the lowest part of the gear case is repairable by replacing the sheet metal section.

7. The invention as defined in claim 6 wherein on one side of the gear case the mounting flange has an outward extension and due to the extension the sheet metal section is wider internally than the upper and lower casing sections for enhanced lubricant capacity.

8. The invention as defined in claim 7 wherein the sheet metal section contains a molded polymer baffle having a longitudinal portion spaced from the said one side of the gear case to define a reserve volume for reserve lubricant beneath the said extension and an active volume for circulating lubricant subject to direct exposure to the gear.

9. The invention as defined in claim 8 wherein the baffle further has respective forwardly and rearwardly inclined partitions fore and aft of the gear for further defining fore and aft reserve volumes respectively to minimize the volume of circulating lubricant.

* * * * *